2,794,732

METHOD FOR PREPARING CALCIUM

Peter P. Alexander, Beverly, Mass., assignor to Metal Hydrides Incorporated, Beverly, Mass., a corporation of Massachusetts No Drawing. Application May 3, 1954,
Serial No. 427,389

2 Claims. (Cl. 75—67)

This invention relates to the production of alkaline earth metals and hydrides of alkaline earth metals, such as barium, strontium and particularly calcium, by conversion of the corresponding anhydrous chlorides or other halide. The invention contemplates the utilization of sodium metal as a principal reactant for effecting such conversion.

It is well known that when sodium metal is heated with molten calcium chloride a reversible reaction takes place which may be represented by the equation

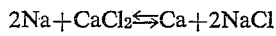

The United States patent to Harvey N. Gilbert No. 2,029,998 shows that when a material containing about 70% of metallic sodium and about 20% of metallic calcium is added to a fused anhydrous mixture of calcium chloride and sodium chloride containing between 60 and 75% by weight of sodium chloride a reaction takes place which is represented by the equation $$Ca+2NaCl \rightarrow 2Na+CaCl_2$$

However, the above mentioned patent shows that only when the calcium chloride content of the bath is maintained at a high value, e. g. more than 70% by weight, the following reaction will occur

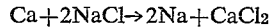

Thus, when metallic sodium is reacted with fused calcium chloride not more than about 30% by weight of the calcium chloride can be converted to calcium metal. This is confirmed by the work of E. Rinck, Comptes Rendus 191, 404–6.

A similar incomplete reaction results when calcium chloride and sodium metal are placed in a confined reaction zone containing an atmosphere of hydrogen heated at a temperature causing fusion but below the distillation temperature of sodium metal. Thus, in the course of my investigations, 66 grams of anhydrous calcium chloride and 23 grams of sodium metal were placed in a confined reaction zone containing hydrogen under a slight pressure and heated at a temperature of about 750° C. for several hours while maintaining a slight hydrogen pressure. Hydrogen had ceased to be absorbed. The resulting product contained 5.5% calcium hydride, the remainder being essentially sodium chloride, sodium metal and unconverted calcium chloride. If the reaction had proceeded to completion, the product should have contained 23.6% calcium hydride.

The present invention is based upon the discovery that anhydrous calcium chloride can be caused to react substantially completely with metallic sodium in an inert atmosphere, such as vacuum or argon, or with metallic sodium in an atmosphere of hydrogen to form reaction mixtures comprising essentially calcium metal and sodium chloride or calcium hydride and sodium chloride respectively when heated at a sufficiently high temperature but below a temperature causing fusion of the halide mixture present during the reaction. Under certain conditions, it is preferable to effect the reaction in two stages. Thus, I may form a reaction mixture comprising calcium metal or calcium hydride, sodium chloride and unconverted calcium chloride by heating anhydrous calcium chloride and sodium metal in an inert atmosphere or in the presence of hydrogen at a temperature between about 250° C. and below the distillation temperature of sodium, and preferably, below the dissociation temperature of sodium hydride. The reaction mixture thus produced then may be heated in finely divided solid form in a confined reaction zone either in an inert atmosphere or in the presence of hydrogen at a high temperature but below the temperature causing fusion of the charge.

In accordance with one method for producing calcium hydride, a preformed finely divided sodium hydride may be intimately mixed with finely divided anhydrous calcium chloride, preferably, in stoichiometric amounts, and the mixture heated in a confined reaction zone in an atmosphere of hydrogen at a temperature between the dissociation temperature of sodium hydride and slightly less than that which causes fusion of the calcium chloride or chloride mixture present during the reaction. The reaction takes place rapidly and goes to substantial completion in a few minutes at temperatures between about 420° C. and 600° C. to produce a reaction mixture consisting essentially of calcium hydride and sodium chloride. The pressure of hydrogen in the reaction zone is sufficient to prevent leakage of air thereinto, a pressure of about one atmosphere being suitable. The sodium chloride can be removed from the reaction mixture by treating the latter with a solvent for sodium chloride which is substantially inert toward calcium hydride to form a liquor comprising a solution of sodium chloride and solid calcium hydride. The solid calcium hydride can be removed from the solution as by filtration. Illustrative solvents are glycerine, propylene glycol, liquid ammonia, etc.

In accordance with a more preferable method for practicing the invention, anhydrous finely divided calcium chloride may be heated in a confined reaction zone in an inert atmosphere or in an atmosphere of hydrogen at a temperature between about 250° C. and 375° C. Sodium metal is added in small amounts with agitation of the mixture, the sodium metal being added at intervals to permit each small amount of sodium metal to melt and coat the calcium chloride and react. After the desired amount of sodium metal has been added, a reaction mixture results which comprises sodium metal, calcium metal, sodium chloride and unconverted calcium chloride when an inert gas is used and comprising sodium hydride, calcium hydride, sodium chloride and unconverted calcium chloride when hydrogen is used. The agitation then may be discontinued and the temperature of the reaction zone raised to a temperature between about 420° C. and slightly less than that which causes fusion of the reaction mixture, preferably between about 420° C. and 600° C., to complete the conversion of the calcium chloride to calcium metal or calcium hydride depending upon the gas used. The latter phase of the reaction is completed in a few minutes. If stoichiometric amounts of calcium chloride and sodium metal are used the reaction product consists essentially of calcium metal and sodium chloride or calcium hydride and sodium chloride. The pressure of the gas used, such as argon or hydrogen, in the reaction zone is sufficient to prevent leakage of air thereinto, a pressure of about one atmosphere being suitable. The sodium chloride may be removed, if desired, by treating the reaction mixture with a suitable solvent as previously described.

The calcium hydride produced by the practice of the present invention, especially when produced by the last above described specific method, is extremely finely divided and has an amorphous, spongy structure. This material is extremely reactive, especially with water. With water, hydrogen is evolved very vigorously and sometimes with sufficient heat to ignite the hydrogen. If this calcium hydride is to be used to generate hydrogen by reacting it with water, it should be treated to lower its reactivity. A suitable treatment for this purpose may comprise heating the calcium hydride to 600° C. to 900° C. under vacuum to dissociate it at least partially to the point where the product contains about 80% free calcium and 20% calcium hydride. Then the product may be re-hydrided at a suitable lower temperature.

While the invention is directed particularly to the production of calcium metal or calcium hydride, it is equally applicable for the production of other alkaline earth metals or hydrides thereof, such as barium and strontium, by replacing the calcium chloride by barium chloride or strontium chloride. Similarly, the chlorides of these metals may be replaced by other halides, such as the iodide, fluoride or bromide.

The invention is illustrated further by the following specific examples.

*Example 1*

In a reaction vessel fitted with an agitator was placed 222 grams of anhydrous calcium chloride after the vessel had been evacuated to remove air and moisture. This was stirred and heated under hydrogen at a pressure of about one atmosphere to 300° C. when the addition of 92 grams of sodium metal was started. Sodium was added in small increments with continued stirring over a period of 154 minutes and hydrogen was added as fast as it was used up. After all the hydrogen and sodium had been reacted, the mixture was stirred for 15 minutes at 325° C. A total of 312.5 grams of product was recovered (98.5% theory). This product was analyzed and found to contain 7.94% sodium hydride and 17.7% calcium hydride, the remainder being sodium chloride and calcium chloride. A conversion of 71.8% of theory occurred in this first step.

The above product was placed in a retort under one atmosphere of hydrogen and heated to 420° C. At this point heat was rapidly evolved and the temperature rose quickly to a maximum of 550° C. Some hydrogen was momentarily evolved but was quickly reabsorbed. The entire reaction was completed in a few minutes. The product was discharged from the retort and analyzed. It contained less than 0.03% unreacted NaH and 25.1% calcium hydride. The remainder was sodium chloride. This represents a 99.8% of theoretical conversion to calcium hydride. Recovery on the second step was 100%.

A ten gram sample of the latter product was extracted with 500 ml. of anhydrous liquid ammonia at −28 to −33° C. The slurry was stirred for 15 minutes and allowed to settle for 5 minutes. The supernatant solution of sodium chloride in liquid ammonia was filtered off by an upward decantation-filtration. The product was washed a second time with 200 ml. of anhydrous liquid ammonia and filtered as previously described. A total of 7 grams of sodium chloride was extracted and recovered from the liquid ammonia. 2.3 grams of $CaH_2$ remained after the extraction and was vacuum dried to remove the last traces of ammonia. The $CaH_2$ analyzed 81.5% $CaH_2$, about 2% sodium chloride and less than 0.1% nitrogen.

*Example 2*

In the reactor described in Example 1 was charged 222 grams of anhydrous calcium chloride after removal of air and moisture. This was stirred and heated under a hydrogen atmosphere to 300° C. Then 92 grams of sodium was added in small increments over a period of 70 minutes. Hydrogen was added as rapidly as it was absorbed. When hydrogen absorption stopped, the temperature of the reactor was raised to 420–450° C. while stirring was continued for 60 minutes. At the end of this period the reactor was cooled under hydrogen, the product discharged and analyzed. It was found to contain 0.35% NaH, 25.0% $CaH_2$, the remainder being sodium chloride. This represents a conversion of 98.9% of theory. Recovery was 98%.

Liquid ammonia extraction of the product was carried out as described in Example 1. From 10 grams of product was recovered 2.6 grams of $CaH_2$ which analyzed 81.5% pure $CaH_2$. 7.4 grams of sodium chloride was recovered from the ammonia solution.

*Example 3*

In the reactor described in Example 1 was charged 333 grams of anhydrous calcium chloride after removal of air and moisture. This was stirred and heated at a temperature between 250° C. and 375° C. under argon at a pressure of about one atmosphere. Then 92 grams of sodium was added in small increments over a period of about 30 minutes. The reaction was continued at about 510° C. for one hour. The reactor then was cooled to 100° C. and the reaction products discharged. The resulting product consisted of 371.4 grams of a mixture of calcium metal and sodium chloride containing 20.3 percent free calcium and 0.87 percent free sodium. This represents a 94.1 percent conversion.

This application is a continuation-in-part of my application Serial No. 383,929, filed October 2, 1953, now Patent No. 2,702,234, issued February 15, 1955.

I claim:

1. The method for reducing calcium chloride which comprises bringing sodium metal in intimate contact with anhydrous calcium chloride in the proportion of two moles of sodium metal per mole of calcium chloride, and maintaining the mixture thus formed in an inert atmosphere at a temperature above about 420° C. until a reaction product is formed comprising essentially calcium metal and sodium chloride, said temperature being less than the melting temperature of the halide mixture present during the reaction.

2. The method for reducing calcium chloride which comprises agitating finely divided anhydrous calcium chloride in an inert atmosphere while heating at a temperature between about 250° C. and 375° C. and while progressively adding small amounts of sodium metal until the amount of sodium metal added is in the proportion of two moles per mole of calcium chloride thereby forming a reaction mixture which includes unreacted sodium metal, sodium chloride, calcium metal and unreacted calcium chloride, and thereafter maintaining said reaction mixture in an inert atmosphere at above about 420° C. until a reaction product is formed comprising essentially sodium chloride and calcium metal, said last mentioned temperature being less than the melting temperature of the halide mixture present during the reaction.

References Cited in the file of this patent

UNITED STATES PATENTS

| | | |
|---|---|---|
| 1,573,083 | Marden | Feb. 16, 1926 |
| 1,704,257 | Marden et al. | Mar. 5, 1929 |
| 2,029,998 | Gilbert | Feb. 4, 1936 |

FOREIGN PATENTS

| | | |
|---|---|---|
| 574,092 | Great Britain | Dec. 20, 1945 |

OTHER REFERENCES

Comprehensive Treatise on Inorganic and Theoretical Chemistry, by Mellor, vol. 3, page 718. Published 1923 by Longmans, Green & Co., New York.